United States Patent [19]

Borrowman et al.

[11] 4,409,189
[45] Oct. 11, 1983

[54] RECOVERY OF TUNGSTEN FROM BRINES

[75] Inventors: S. Ralph Borrowman, Bountiful; Paulette B. Altringer, Summit Park; Parkman T. Brooks, Salt Lake City, all of Utah

[73] Assignee: The United States of America as represented by the Secretary of the Interior, Washington, D.C.

[21] Appl. No.: 397,735

[22] Filed: Jul. 13, 1982

[51] Int. Cl.³ .............................................. C01G 41/00
[52] U.S. Cl. ...................................... 423/54; 423/87; 423/276; 423/511
[58] Field of Search .................... 423/54, 87, 276, 511

[56] References Cited

U.S. PATENT DOCUMENTS 4,180,628 12/1979 Marchant et al. ..................... 423/54
4,241,028 12/1980 Borrowman et al. ................. 423/54
4,278,643 7/1981 Natansohn et al. .................... 423/54
4,279,869 7/1981 Coulson ................................ 423/54

OTHER PUBLICATIONS

Altringer et al., "Bureau of Mines-RI 8315", Dept. of Interior, Wash., D.C., 1978.

Primary Examiner—Herbert T. Carter
Attorney, Agent, or Firm—William S. Brown

[57] ABSTRACT

Tungsten is recovered from alkaline brines by: (1) initial loading of metal values on an 8-hydroxyquinoline-resorcinol-formaldehyde resin, (2) selective desorption of boron, arsenic and sulfur from the resin by means of an $NH_4Cl$—$NH_4OH$ solution having a pH of about 7.5 to 9.5, and (3) desorption of tungsten from the resin by means of water or an alkaline solution.

6 Claims, No Drawings

RECOVERY OF TUNGSTEN FROM BRINES

This invention relates to a process for recovery of metal values, particularly tungsten, from alkaline brines by means of an ion exchange resin consisting of a copolymer of 8-hydroxyquinoline, resorcinol and formaldehyde (QRF). The use of such resins for sorption of tungsten from alkaline brines is disclosed in U.S. Pat. No. 4,241,028, the disclosure of which is incorporated herein by reference. As disclosed in said patent, elution of tungsten from the resin may be accomplished by means of aqueous eluants such as water or alkaline solutions. However, tungsten recovered by this process often contains unacceptable levels of contaminants such as boron, arsenic and sulfur.

It has now been found, according to the process of the invention, that such contamination may be substantially reduced by selective removal of the contaminants prior to tungsten elution. This is accomplished by means of a two-stage elution process in which boron, arsenic and sulfur are removed in a first elution stage, with tungsten then being recovered in a second elution stage. It has been found, in particular, that boron, arsenic and sulfur may be eluted, with minimal elution of tungsten, by employing as eluant an ammoniacal ammonium chloride solution, i.e., an aqueous solution of $NH_4Cl$ and $NH_4OH$. Tungsten is then recovered, in the second stage, by elution with aqueous eluants such as water or alkaline solutions.

Although tungsten recovery by the process of the invention may be by means of a batch process, the use of an ion exchange column in conventional manner is usually more efficient. In such a process, the feed solution, i.e., the tungsten-containing brine, is passed through a column of the resin, whereby tungsten, as well as boron, arsenic and sulfur, are sorbed on the resin. Recovery of the sorbed materials is then accomplished by passing the eluant solutions through the column in the two-stage procedure of the invention.

The ammoniacal ammonium chloride solution, used in the first-stage elution, consists of an aqueous solution of $NH_4Cl$, in a concentration of about 0.1 to 2 N, and $NH_4OH$ in an amount sufficient to provide a pH of about 7.5 to 9.5. Optimum size of the ion exchange column, flow rates and volumes of feed and eluant solutions, and elution temperatures will vary with the specific feed solution and specific composition and particle size of the resin, and are best determined experimentally. Generally, room temperature is satisfactory, although higher temperatures, e.g., up to about 75° C., generally provide more efficient elution.

As mentioned above, elution of tungsten in the second stage of the elution process of the invention is accomplished by means of eluants such as water or alkaline aqueous solutions, e.g., ammonium hydroxide or sodium carbonate solutions. Again, elevated temperature generally gives more efficient elution. Suitable concentrations of $NH_4OH$ are about 0.5 N to 5 N, while those of $Na_2CO_3$ are about 0.01 M to 1 M.

The process of the invention will be more specifically illustrated by the following examples.

EXAMPLE 1

Three columns, 7.6 cm in diameter, were filled to a depth of 91.4 cm with 20- to 48-mesh QRF resin beads of the type disclosed in U.S. Pat. No. 4,241,028. The resin was then loaded by passing 426 liters (101 bed-volumes) of 32° C. carbonated brine through two series-connected columns at a flow rate of 20.4 ml/min cm² of column cross-sectional area. The brine pH was 7.5 and it contained, in g/l, 0.075 $WO_3$, 140 $Cl^-$, 123 $Na^+$, 8.7 $B_4O_7^=$, 68 $SO_4^=$, 25 $K^+$, 8 $CO_3^=$, 5 $HCO_3^-$, 0.8 $PO_4^\equiv$, 0.8 $Br^-$, 0.2 $S^=$, 0.2 As, and 0.1 $I^-$. The tungsten content of the effluent was 0.006 g/l $WO_3$, indicating 92-pct sorption. Sorption of $B_4O_7^=$, As, and $S^=$ were 1.3, 1.7, and 2.3 pct, respectively.

The loaded resin contained in the first of the series-connected columns was then eluted with 8.4 liters (2 bed-volumes) of a pH 8.3 aqueous solution of 1 N $NH_4Cl$ and 0.1 N $NH_4OH$. Eluant flow was 1.0 ml/min cm² and the elution temperature was 25° C. Eluate analysis showed 1.6-pct elution of $WO_3$, 98-pct elution of $B_4O_7^=$, 74-pct elution of As, and 65-pct elution of $S^=$.

The resin was then eluted with 22 liters (5.3 bed-volumes) of potable water. Eluant flow rate was 1.0 ml/min cm² and the eluant temperature was 75° C. Eluate analysis showed 99-pct tungsten elution.

This sequence of operations was continued, whereby the second resin column was advanced to the first loading position and the third column, barren of tungsten, became the second column in the two-column loading series. Results of continued operations were similar to the initial results. This technique enabled removing, purifying, and concentrating tungsten from a semicontinuous stream of feed.

EXAMPLE 2

Three columns, 2.54 cm in diameter, were filled to a depth of 20 cm with 20- to 48-mesh QRF resin beads of the type used in Example 1. The resin was then loaded by passing 9.6 liters (96 bed-volumes) of 32° C. carbonated brine through two series-connected columns at a flow rate of 1.97 ml/min cm² of column cross-sectional area. The feed was Searles Lake brine as in Example 1. The tungsten content of the effluent was 0.0019 g/l $WO_3$, indicating 97-pct sorption. Sorption of $B_4O_7^=$ and As were 1.3 and 1.8 pct, respectively.

The loaded resin contained in the first of the series-connected columns was then eluted with 231 ml (2.3 bed-volumes) of a pH 8.3 aqueous solution of 1 N $NH_4Cl$ and 0.1 N $NH_4OH$. Eluant flow was 0.25 ml/min cm² and the elution temperature was 32° C. Eluate analysis showed 2.6-pct elution of $WO_3$, 97-pct elution of $B_4O_7^=$ and 77-pct elution of As.

The resin was then eluted with 270 ml (2.7 bed-volumes) of 3 N $NH_4OH$ solution. Eluant flow rate was 0.25 ml/min cm² and the elution temperature was 32° C. Eluate analysis showed 100-pct tungsten elution.

This sequence of operations was continued, in the manner described in Example 1, for recovering tungsten from a semicontinuous feed stream.

EXAMPLE 3

Three columns, 7.6 cm in diameter, were filled to a depth of 91.4 cm with 20- to 48-mesh QRF resin beads of the type used in Example 1. The resin was then loaded by passing 412 liters (98 bed-volumes) of 32° C. carbonated brine through two series-connected columns at a flow rate of 20.4 ml/min cm² of column cross-sectional area. The feed was Searles Lake brine as in Example 1. The tungsten content of the effluent was 0.007 g/l $WO_3$, indicating 91-pct sorption. Sorption of $B_4O_7^=$, As, and $S^=$ were 1.3, 1.8, and 1.3 pct, respectively.

The loaded resin contained in the first of the series-connected columns was then eluted with 8.4 liters (2 bed-volumes) of 1 N NH$_4$Cl and 0.1 N NH$_4$OH. Eluant flow was 1.0 ml/min cm$^2$ and the elution temperature was 25° C. Eluate analysis showed 2.4-pct elution of WO$_3$, 98-pct elution of B$_4$O$_7$=, 82-pct elution of As, and 80-pct elution of S=.

The resin was then eluted with 22 liters (5.3 bed-volumes) of 0.5 M Na$_2$CO$_3$ solution. Eluant flow rate was 1.0 ml/min cm$^2$ and the eluant temperature was 50° C. Eluate analysis showed 95-pct tungsten elution.

This sequence of operations was continued in the manner described in Example 1 for recovering tungsten from a semicontinuous feed stream.

We claim:

1. A process for recovery of tungsten from alkaline brines containing boron, arsenic and sulfur impurities comprising:

(a) contacting the brine with a resin consisting essentially of a copolymer of 8-hydroxyquinoline, resorcinol and formaldehyde to load the resin with tungsten and a portion of said impurities;

(b) contacting the loaded resin with an aqueous solution of ammonium chloride, in a concentration of about 0.1 to 2 normal, and ammonium hydroxide in an amount sufficient to provide a pH of about 7.5 to 9.5 to selectively remove boron, arsenic and sulfur values, and thereafter (c) contacting the loaded resin with water or an alkaline aqueous solution to remove tungsten.

2. The process of claim 1 in which the resin and solutions are contacted by passing the solutions through a column containing the resin.

3. The process of claim 1 in which the NH$_4$Cl—NH$_4$OH solution has a pH of about 8.3.

4. The process of claim 1 in which removal of tungsten is by means of water at elevated temperature.

5. The process of claim 1 in which removal of tungsten is by means of ammonium hydroxide solution.

6. The process of claim 1 in which removal of tungsten is by means of sodium carbonate solution.

* * * * *